United States Patent
Bannai et al.

(10) Patent No.: US 10,095,364 B2
(45) Date of Patent: Oct. 9, 2018

(54) IN-VEHICLE INPUT DEVICE

(71) Applicant: Alps Electric Co., Ltd., Tokyo (JP)

(72) Inventors: Hiroyuki Bannai, Tokyo (JP); I Ka, Tokyo (JP); Atsushi Masuda, Tokyo (JP); Kazuhiko Hiratsuka, Tokyo (JP); Marcello Milli, Tokyo (JP)

(73) Assignee: Alps Electric Co., Ltd., Tokyo (JP)

( * ) Notice: Subject to any disclaimer, the term of this patent is extended or adjusted under 35 U.S.C. 154(b) by 85 days.

(21) Appl. No.: 15/167,416

(22) Filed: May 27, 2016

(65) Prior Publication Data
US 2016/0357287 A1 Dec. 8, 2016

(30) Foreign Application Priority Data

Jun. 8, 2015 (JP) ................... 2015-115486

(51) Int. Cl.
*G06F 3/044* (2006.01)
*G06F 3/0488* (2013.01)
*G06F 3/041* (2006.01)
*B60K 35/00* (2006.01)

(52) U.S. Cl.
CPC ............. *G06F 3/044* (2013.01); *B60K 35/00* (2013.01); *G06F 3/0416* (2013.01); *G06F 3/04883* (2013.01); *G06F 3/04886* (2013.01); *B60K 2350/1028* (2013.01); *B60K 2350/928* (2013.01)

(58) Field of Classification Search
CPC .. G06F 3/044; G06F 3/04886; G06F 3/04883; G06F 3/0416; B60K 35/00; B60K 2350/1028; B60K 2350/928
See application file for complete search history.

(56) References Cited

U.S. PATENT DOCUMENTS

| 9,537,013 | B2 * | 1/2017 | Nishinohara | ..... H01L 29/78606 |
| 2010/0300862 | A1 * | 12/2010 | Tamura | .................. G06F 3/0412 |
| | | | | 200/600 |
| 2014/0292695 | A1 * | 10/2014 | Wakamoto | ............ G06F 3/1423 |
| | | | | 345/173 |
| 2014/0309864 | A1 * | 10/2014 | Ricci | ..................... H04W 48/04 |
| | | | | 701/36 |

FOREIGN PATENT DOCUMENTS

| JP | 2000-018905 | 1/2000 |
| JP | 2002-225724 | 8/2002 |

* cited by examiner

*Primary Examiner* — Charles Hicks
(74) *Attorney, Agent, or Firm* — Beyer Law Group LLP

(57) ABSTRACT

An in-vehicle input device includes a touch panel including a lower electrode, an upper electrode, and a spacer, and is capable of detecting a capacitance between the lower electrode and the upper electrode. The device has an operation surface located above the upper electrode. The operation surface includes a plurality of operation areas. The spacer has a plurality of openings that coincide with the operation areas in plan view. The device further includes a suppression layer that is disposed between the operation surface and the upper electrode or disposed on an upper surface of the operation surface. The suppression layer eliminates or reduces formation of a capacitance between the upper electrode and an operator. The device detects an input operation based on a change in distance between the lower electrode and the upper electrode in response to pressing any of the operation areas by the operator.

6 Claims, 7 Drawing Sheets

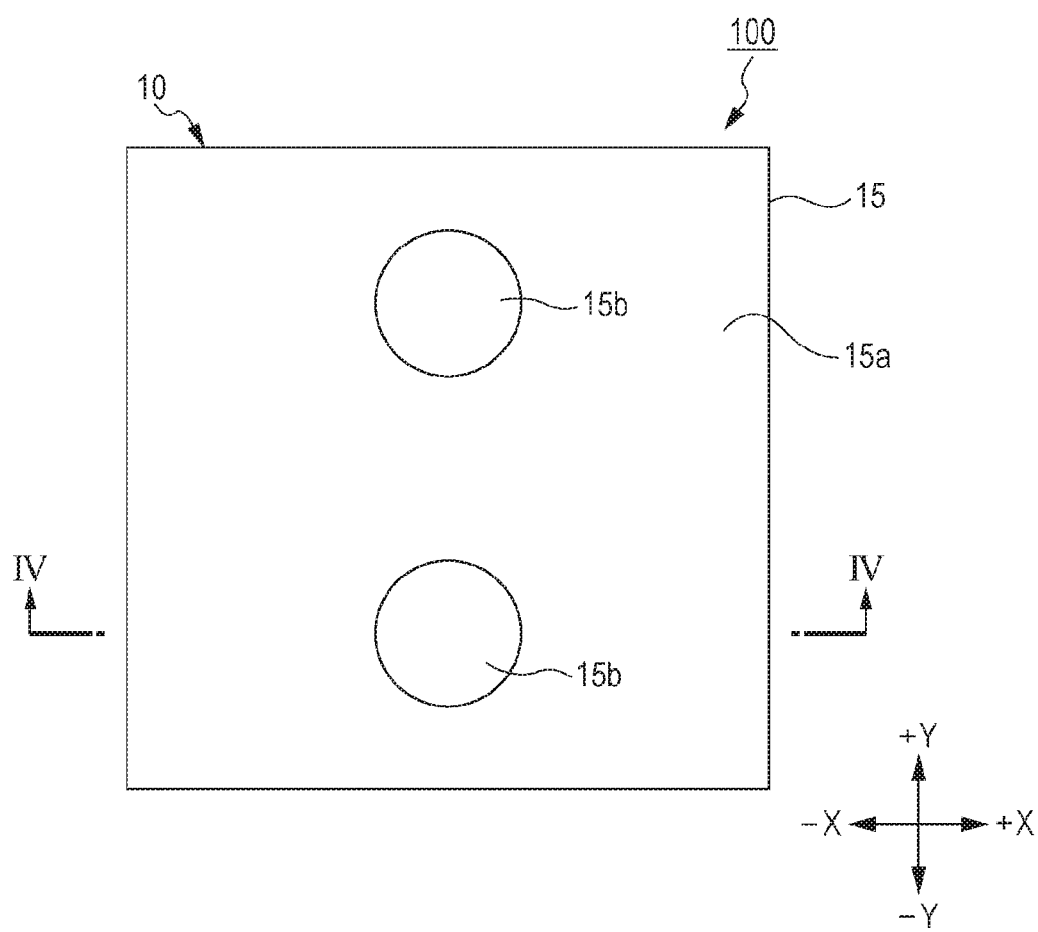

IN-VEHICLE INPUT DEVICE

CLAIM OF PRIORITY

This application claims benefit of Japanese Patent Application No. 2015-115486 filed on Jun. 8, 2015, which is hereby incorporated by reference.

BACKGROUND OF THE INVENTION

1. Field of the Invention

The present invention relates to in-vehicle input devices, and in particular, relates to an in-vehicle input device that can be operated with a touch panel disposed on a steering wheel.

2. Description of the Related Art

In-vehicle input devices including touch panels instead of mechanical input units have recently been developed. Such an input device has a switch operation area disposed on a steering wheel to provide layout flexibility and a flat appearance. Touch panel input devices are widely used mainly for mobile apparatuses. Such a touch panel input device detects an input operation based on a change in capacitance caused when an operator operating a mobile apparatus moves their finger closer to an operation surface of the input device.

If such a touch panel input device for a mobile apparatus is used for an in-vehicle apparatus, the input device may be erroneously operated in response to the motion of a driver driving a vehicle. For example, if the driver rotates a steering wheel provided with the touch panel input device in order to turn the vehicle, their hand and fingers will move over an operation surface of a touch panel. Unfortunately, an unintended operation may be performed, causing a safety problem.

As a typical in-vehicle touch panel input device that is less likely to be erroneously operated, Japanese Unexamined Patent Application Publication No. 2002-225724 discloses an operation device for in-vehicle apparatuses. The operation device will now be described with reference to FIG. 10.

The operation device, indicated at 900, includes a steering wheel 901 for steering a vehicle, a display 904 for displaying an operation mode image 913 for the in-vehicle apparatuses, a touch panel 907 that a driver can give input to or operate by touching, and a display/load controller (control unit) 909. The display 904 is disposed on an instrument panel 902 of the vehicle so as to face the steering wheel 901. The touch panel 907 is disposed on the steering wheel 901 and serves as a light-transmissive window 916 through which the driver can view the operation mode image 913. The display/load controller 909 outputs operation information to an in-vehicle apparatus in response to an input operation on the touch panel 907 only while the steering wheel 901 is held in a straight-ahead driving position or in the vicinity of this position.

The operation device with such a configuration substantially rejects input operations on the touch panel while the driver rotates the steering wheel, thus preventing an erroneous operation during driving. This achieves safety. In addition, the light-transmissive touch panel allows the driver to view the display, thus maintaining visibility.

In the operation device 900, however, any input operation cannot be performed while the driver rotates the steering wheel. If the steering wheel is in the straight-ahead driving position, a likelihood that the touch panel may be erroneously operated will still remain because the driver may unconsciously move part of their body over the touch panel while driving, for example, while driving in a forward-leaning posture or while driving with one hand on upper part of the steering wheel. Furthermore, the driver may wear gloves while driving in, for example, a cold climate area. The gloves insulate fingers from an electrode of the touch panel. If the driver moves their gloved finger closer to the operation surface of the touch panel, a capacitance will not be formed between the gloved finger and the electrode of the touch panel. Unfortunately, the touch panel cannot be operated.

SUMMARY OF THE INVENTION

The present invention has been made in view of the above-described circumstances in the related art, and provides an in-vehicle input device that is less likely to be erroneously operated and that can be reliably operated regardless of an operation state of a steering wheel as well as whether an operator wears a glove.

An aspect of the present invention provides an in-vehicle input device that includes a touch panel including a lower electrode, an upper electrode facing the lower electrode, and a spacer disposed between the lower electrode and the upper electrode. The input device is capable of detecting a capacitance between the lower electrode and the upper electrode. The device has an operation surface located above the upper electrode. The operation surface includes a plurality of operation areas. The spacer has a plurality of openings that coincide with the operation areas in plan view. The device further includes a suppression layer that is disposed between the operation surface and the upper electrode or disposed on an upper surface of the operation surface. The suppression layer eliminates or reduces formation of a capacitance between the upper electrode and an operator. The device detects an input operation based on a change in distance between the lower electrode and the upper electrode in response to pressing any of the operation areas by the operator.

The in-vehicle input device with such a configuration detects an input operation in response not to touching the touch panel with the operator's finger, but to pressing any of the operation areas with the finger. If the operator wears gloves, the operator can operate the input device. Furthermore, the suppression layer, which eliminates or reduces the formation of a capacitance between the operator and the upper electrode, can prevent an erroneous operation from being caused by unintended finger motion during driving. In addition, the operator can press the operation areas of the touch panel while rotating a steering wheel, and can thus perform an input operation regardless of an operation state of the steering wheel.

In this aspect, the in-vehicle input device may further include a first detecting unit configured to detect an input operation based on contact between the lower electrode and the upper electrode in response to pressing any of the operation areas by the operator and a second detecting unit configured to detect an input operation based on a change in capacitance caused by a change in distance between the lower electrode and the upper electrode in response to pressing any of the operation areas by the operator.

In the in-vehicle input device with such a configuration, the first detecting unit based on contact between the lower electrode and the upper electrode and the second detecting unit based on a change in capacitance between the lower electrode and the upper electrode, namely, the two different detecting units can be used differently based on the magnitude of a pressure applied to the operation area.

In this aspect, the first detecting unit may detect a switch operation in the operation area and the second detecting unit may detect a slide operation in the operation area.

In the in-vehicle input device with such a configuration, a switch operation for the first detecting unit and a slide operation for the second detecting unit can be combined. This facilitates various operations.

In this aspect, the operation surface may include a first operation area and a second operation area and the spacer may have a first opening corresponding to the first operation area and a second opening corresponding to the second operation area. The in-vehicle input device may detect a flick operation in response to an operation of the second operation area as the second detecting unit in a predetermined period of time after an operation of the first operation area as the first detecting unit.

In the in-vehicle input device with such a configuration, a flick operation can be easily performed.

In this aspect, the operation surface may include a plurality of third operation areas and the spacer may have a plurality of third openings corresponding to the third operation areas. Each of the third openings may be filled with an elastic member and each of the third areas may be a protrusion that protrudes upward from the operation surface.

In the in-vehicle input device with such a configuration, the length of each of the third openings in a sliding direction in which the operator performs a slide operation can be reduced, thus reducing a likelihood that the aging deformation or sag of an operation sheet including the operation surface may affect an operation. In addition, each of the third operation areas is the protrusion protruding upward from the operation surface. This facilitates an operation in the third operation area having the reduced length in the sliding direction. This also eliminates the need for viewing the touch panel, thus increasing the safety of driving.

In this aspect, the in-vehicle input device may further include a conductive contact member disposed at least one of facing surfaces of the lower and upper electrodes such that the contact member protrudes into each of the openings.

The in-vehicle input device with such a configuration includes the contact member and can thus be operated by lightly pressing any of the operation areas. It is particularly effective when the operation area is used as the first detecting unit that requires a greater pressure than the second detecting unit.

BRIEF DESCRIPTION OF THE DRAWINGS

FIG. 3 is a partial plan view of the in-vehicle input device according to the first embodiment;

DESCRIPTION OF THE PREFERRED EMBODIMENTS

Figure 1:
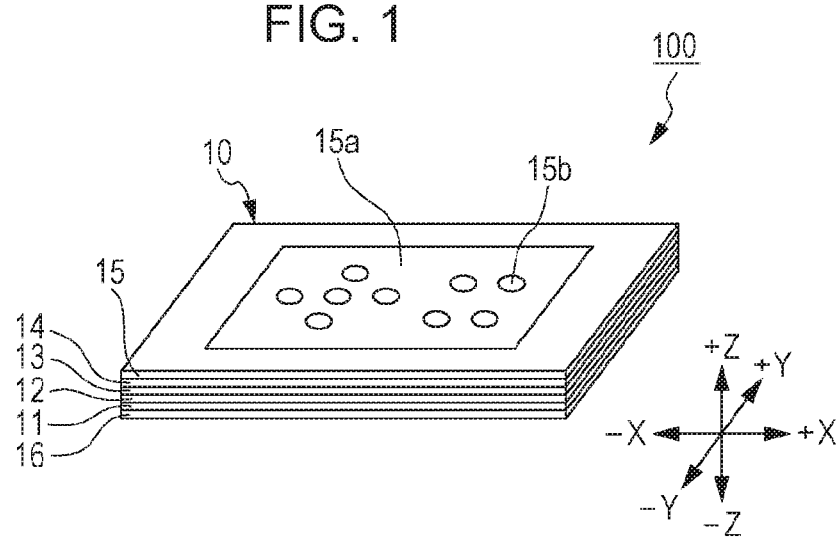
FIG. 1 is a perspective view of an in-vehicle input device according to a first embodiment.

An in-vehicle input device according to the present invention will be described with reference to the drawings. The in-vehicle input device according to the present invention is used to operate various systems and apparatuses in a vehicle, for example, an air-conditioner, a cruise control system, and an in-vehicle audio system. Applications of the in-vehicle input device according to the present invention are not limited to the following embodiments and may be appropriately modified. As used herein, unless otherwise noted, the term "+X direction" refers to the rightward direction in the drawings, the term "−X direction" refers to the leftward direction, the term "+Y direction" refers to the direction away from an operator, the term "−Y direction" refers to the direction closer to the operator, the term "+Z direction" refers to the upward direction, and the term "−Z direction" refers to the downward direction.

First Embodiment

Figure 2:
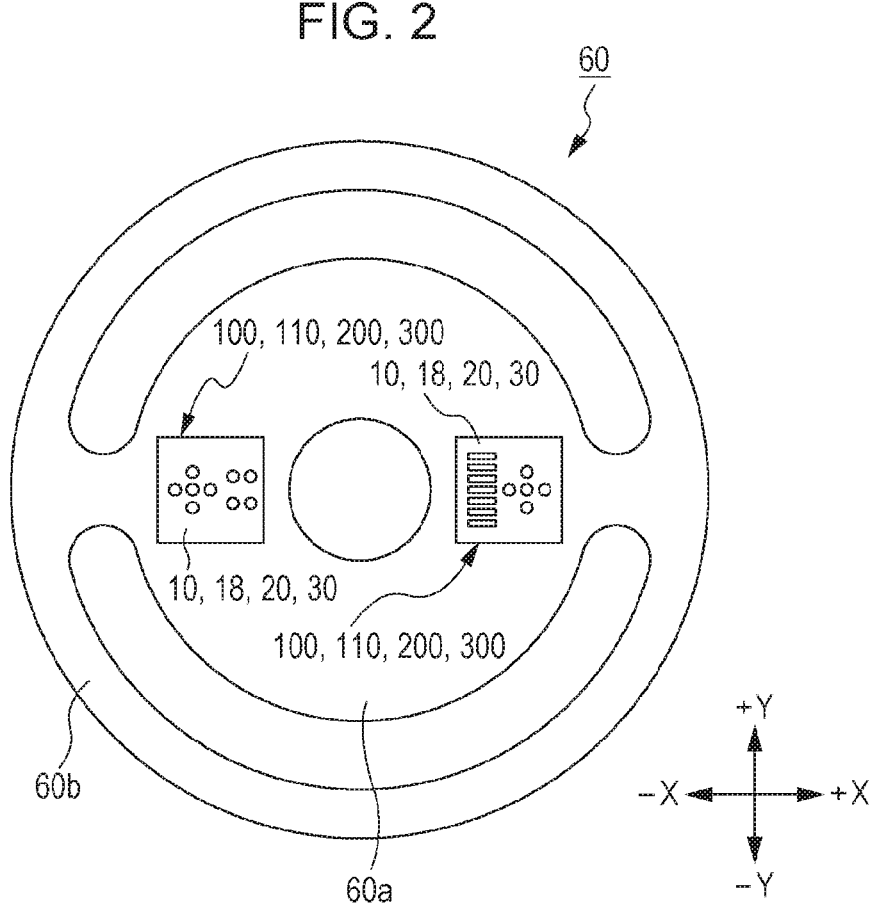
FIG. 2 is a plan view illustrating the in-vehicle input device mounted on a steering wheel.
Figure 4A:
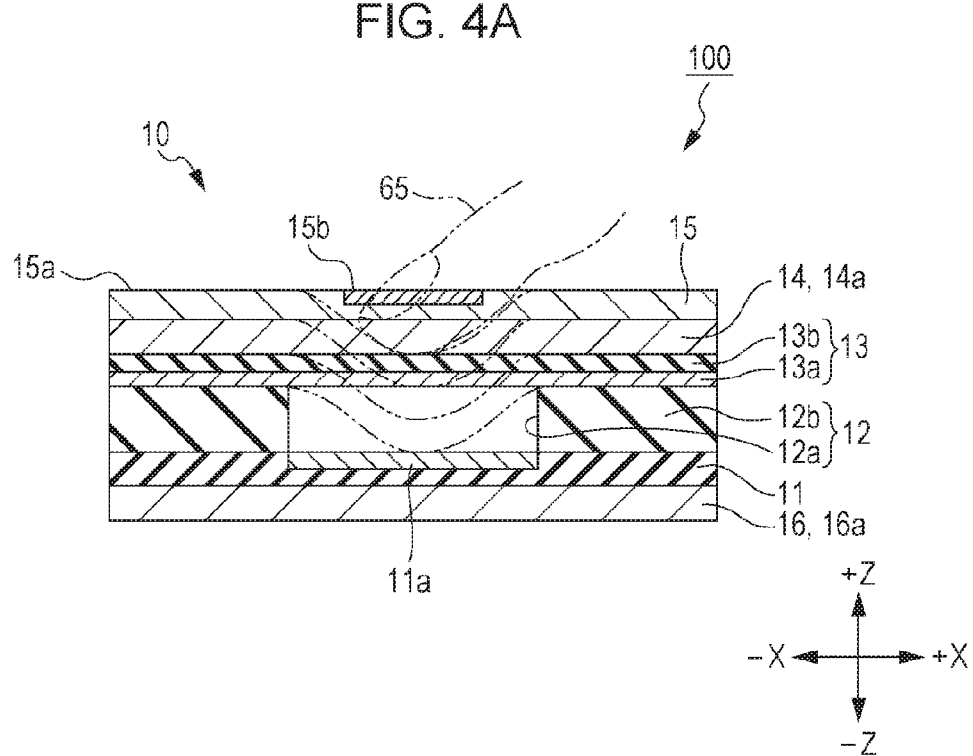
FIGS. 4A and 4B are partial sectional views of the in-vehicle input device according to the first embodiment.
Figure 4B:
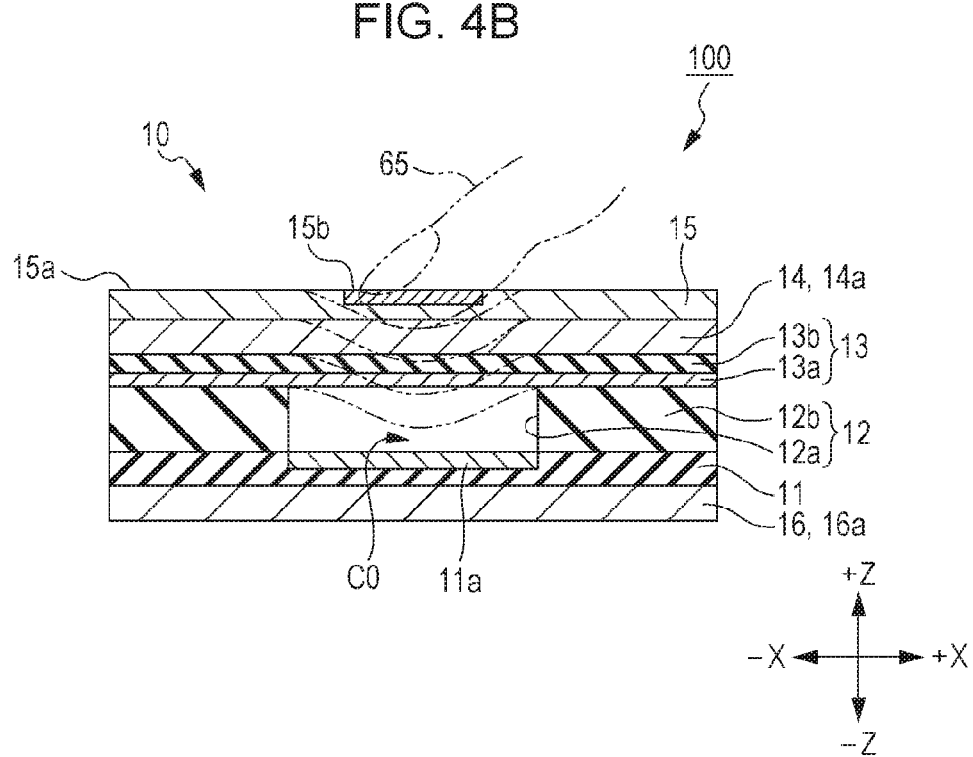

An exemplary configuration of an in-vehicle input device 100 according to a first embodiment of the present invention will be described with reference to FIGS. 1 to 4B. FIG. 1 is a perspective view of the in-vehicle input device 100. FIG. 2 is a plan view illustrating the in-vehicle input device 100 mounted on a steering wheel 60 of a vehicle. FIG. 3 is an enlarged plan view of part of the in-vehicle input device 100. FIGS. 4A and 4B are enlarged sectional views of part of the in-vehicle input device 100 as viewed from the line IV-IV in FIG. 3. FIG. 4A is a sectional view of the part of the in-vehicle input device 100 used as a first detecting unit. FIG. 4B is a sectional view of the part of the in-vehicle input device 100 used as a second detecting unit. In FIGS. 4A and 4B, the input device in a state when an operator presses an operation area 15b with a finger 65 is indicated by alternate long and two short dashes lines. The same indication applies to in-vehicle input devices 110, 200, and 300, which will be described later.

As illustrated in FIG. 1, the in-vehicle input device 100 includes a thin, sheet-shaped touch panel 10. As illustrated in FIG. 2, the in-vehicle input device 100 includes two touch panels 10 mounted on the right and left of central part 60a of the steering wheel 60 of the vehicle such that the touch panels 10 are adjacent to wheel part 60b, or so that the operator can easily operate the in-vehicle input device 100.

Referring to FIG. 1, upper part of the in-vehicle input device 100, or an upper surface of the touch panel 10 includes an operation surface 15a. The operation surface 15a includes a plurality of operation areas 15b as illustrated in FIGS. 1 and 3. To perform a predetermined input operation, the operator of the in-vehicle input device 100 places their finger on any of the operation areas 15b. The operator can perform the predetermined input operation only when pressing the operation area 15b with the finger placed thereon. In other words, the in-vehicle input device 100 is configured such that the operator cannot perform an input operation by merely touching the surface of the operation area 15b.

As illustrated in FIG. 1, each touch panel 10 includes, in sequence from top to bottom, an operation sheet 15, a suppression layer 14, an upper sheet 13, a spacer 12, a lower sheet 11, and a lower suppression layer 16.

As illustrated in FIGS. 4A and 4B, the lower sheet 11 includes a lower electrode 11a disposed in upper part thereof. The upper sheet 13 includes an upper electrode 13a and an insulating layer 13b such that the upper electrode 13a faces the lower electrode 11a. Referring to FIG. 4B, a capacitance C0 that depends on the distance between the lower electrode 11a and the upper electrode 13a is formed between the lower electrode 11a and the upper electrode 13a.

The lower sheet 11 excluding the lower electrode 11a and the insulating layer 13b of the upper sheet 13 are made of insulating plastic, such as polyethylene terephthalate (PET). The lower electrode 11a and the upper electrode 13a are made of conductive metal.

In addition to the touch panels 10, the in-vehicle input device 100 includes an input detecting circuit (not illustrated) electrically connected to the touch panels 10. Thus, the in-vehicle input device 100 can determine the capacitance C0 between the lower electrode 11a and the upper electrode 13a and detect contact between the lower electrode 11a and the upper electrode 13a.

As illustrated in FIGS. 4A and 4B, the spacer 12 is disposed between the lower sheet 11 and the upper electrode 13a. The spacer 12 includes an insulator 12b disposed between the lower sheet 11 and the upper electrode 13a and has a plurality of openings 12a arranged between the lower electrode 11a and the upper electrode 13a such that the openings 12a coincide with the respective operation areas 15b in plan view. The insulator 12b can be formed by, for example, applying a resist liquid to a surface of the lower sheet 11 and hardening the resist liquid with a photoresist. The openings 12a can be formed by, for example, disposing a mask having predetermined shaped openings on the insulator 12b formed with the photoresist, applying light to the insulator 12b having the mask thereon, and developing the insulator 12b. Alternatively, the openings 12a can be formed with a laser.

As described above, the operation surface 15a is included in an upper surface of the operation sheet 15. In other words, the operation surface 15a including the operation areas 15b is disposed above the upper electrode 13a. As illustrated in FIG. 3, the operation areas 15b are arranged at a predetermined distance from each other. The operation areas 15b are set such that they can be independently operated. Although each operation area 15b has a circular shape in the present embodiment, the operation area 15b may have, for example, a rectangular shape.

The operation areas 15b have marks, representing characters and symbols, such as "+", "−", ">", "<", "TEMP", and "MODE", printed or imprinted on the operation surface 15a, which is flat. The operation areas 15b are located at positions above, or corresponding to the above-described openings 12a. When any of the operation areas 15b having the marks is pressed downward (depression), information associated with the above-described character or symbol can be input. A surface on which marks are printed is not limited to the operation surface 15a. Marks may be printed on a lower surface of the operation sheet 15 or on the suppression layer 14. Alternatively, the marks may be printed on a film-shaped member separate from the operation sheet 15, and the film-shaped member with the printed marks may be bonded to the upper surface or the lower surface of the operation sheet 15 or the suppression layer 14.

The suppression layer 14 formed by, for example, printing or applying conductive metal, such as silver, is disposed between the upper sheet 13 and the operation sheet 15 as described above. Consequently, the suppression layer 14 functions as a shielding layer 14a that acts as a shield between the upper electrode 13a included in the upper sheet 13 and the operation surface 15a included in the upper surface of the operation sheet 15. Thus, the suppression layer 14 eliminates or reduces the formation of a capacitance between the operator and the upper electrode 13a. If the operator touches the operation surface 15a including the operation areas 15b with the finger 65, the suppression layer 14 will isolate the upper electrode 13a from the operator. While the operator's finger 65 is merely placed on the operation surface 15a, the capacitance C0 between the lower electrode 11a and the upper electrode 13a is not changed.

The suppression layer 14 may be disposed on the upper surface of the operation sheet 15, or on an upper surface of the operation surface 15a, instead of between the upper sheet 13 and the operation sheet 15. In such a case, while the operator's finger 65 is merely placed on the operation surface 15a, the capacitance C0 between the lower electrode 11a and the upper electrode 13a is not changed.

The suppression layer 14 or the shielding layer 14a may be included in the upper sheet 13 such that the layer is disposed on an upper surface of the insulating layer 13b or disposed under the operation sheet 15. In the present embodiment and other embodiments of the present invention, the upper sheet 13 and the operation sheet 15 are different sheets. The components from the upper electrode 13a to the operation surface 15a may be included in a single sheet.

In some embodiments, only the suppression layer 14 is disposed so as to extend over the upper electrode 13a. In the present embodiment, as described above, the lower suppression layer 16 that serves as a lower shielding layer 16a is disposed on a lower surface of the lower sheet 11. In this arrangement, if the operator's finger 65 is placed under the touch panel 10, the capacitance C0 between the lower electrode 11a and the upper electrode 13a will not be changed. The lower suppression layer 16, or the lower shielding layer 16a is disposed on the lower surface of the lower sheet 11. Preferably, the suppression layer 14 completely isolates the upper electrode 13a from the operator to completely prevent formation of a capacitance between the upper electrode 13a and the operator. If the suppression layer 14 does not completely isolate the upper electrode 13a from the operator, it will be necessary to set a threshold so that an operation is not detected when a capacitance formed by an operator's touch on the operation surface 15a without any depression is less than the threshold. This may allow the operation surface 15a to include a dead zone unresponsive to an operator's depression on the operation surface 15a, leading to poor response. In contrast, as long as the suppression layer 14 can completely isolate the upper electrode 13a from the operator and thus completely prevent the formation of a capacitance between the upper electrode 13a and the operator, such a dead zone will not be formed, thus enhancing ease of operation.

Operations of the in-vehicle input device 100 will now be described with reference to FIGS. 3 to 4B.

When the operator's finger 65 presses any of the operation areas 15b of the operation surface 15a, the upper sheet 13 is curved and deformed downwardly as indicated by alternate long and two short dashes lines in FIGS. 4A and 4B, resulting in a change in distance between the upper electrode 13a and the lower electrode 11a in the opening 12a.

As illustrated in FIG. 4A, when the operator firmly presses the operation area 15b with the finger 65, the upper electrode 13a is brought into contact with the lower electrode 11a. In other words, the distance between the upper electrode 13a and the lower electrode 11a becomes zero. Such an input operation is detected by the first detecting unit. When the distance between the upper electrode 13a and the lower electrode 11a is zero as described above, no capacitance is formed as will be understood.

As illustrated in FIG. 4B, when the operator lightly presses the operation area 15b with the finger 65 and slides the finger 65, the distance between the upper electrode 13a and the lower electrode 11a changes, and the capacitance C0 between the upper electrode 13a and the lower electrode 11a changes due to a change in the distance therebetween. Such an input operation based on a change in the capacitance C0 is detected by the second detecting unit. The first detecting unit and the second detecting unit can be used differently based on the magnitude of a pressure applied to the operation area 15b by the operator's finger 65 and sliding or non-sliding of the operator's finger 65.

The first detecting unit illustrated in FIG. 4A can be used for a switch operation in the operation area 15b based on the contact between the lower electrode 11a and the upper electrode 13a. For example, it is assumed that the operation area 15b located farther from the operator (in the +Y direction) of the multiple operation areas 15b in FIG. 3 is used for a switch operation for the in-vehicle audio system. For example, the following switching can be performed: first pressing this operation area 15b receives an AM radio broadcast and further pressing the operation area 15b receives an FM radio broadcast.

The second detecting unit illustrated in FIG. 4B can be used for a slide operation in the operation area 15b based on a change in the capacitance C0 between the lower electrode 11a and the upper electrode 13a caused by a change in the distance therebetween. For example, it is assumed that the operation area 15b located closer to the operator (in the −Y direction) of the multiple operation areas 15b in FIG. 3 is used for a slide operation for the in-vehicle audio system. For example, the following operation can be performed: pressing this operation area 15b and sliding on the area changes an AM or FM radio broadcast receive frequency based on a change in the distance between the lower electrode 11a and the upper electrode 13a.

In the above description of the in-vehicle input device 100 according to this embodiment, the operation area 15b located farther from the operator (in the +Y direction) of the operation areas 15b in FIG. 3 is used as the first detecting unit and the operation area 15b located closer to the operator (in the −Y direction) is used as the second detecting unit. Sine these operation areas 15b are independent of each other, both the areas can be used as the first detecting units or the second detecting units. Each of the operation areas 15b can be used in various manners.

Modification of First Embodiment

Figure 5:
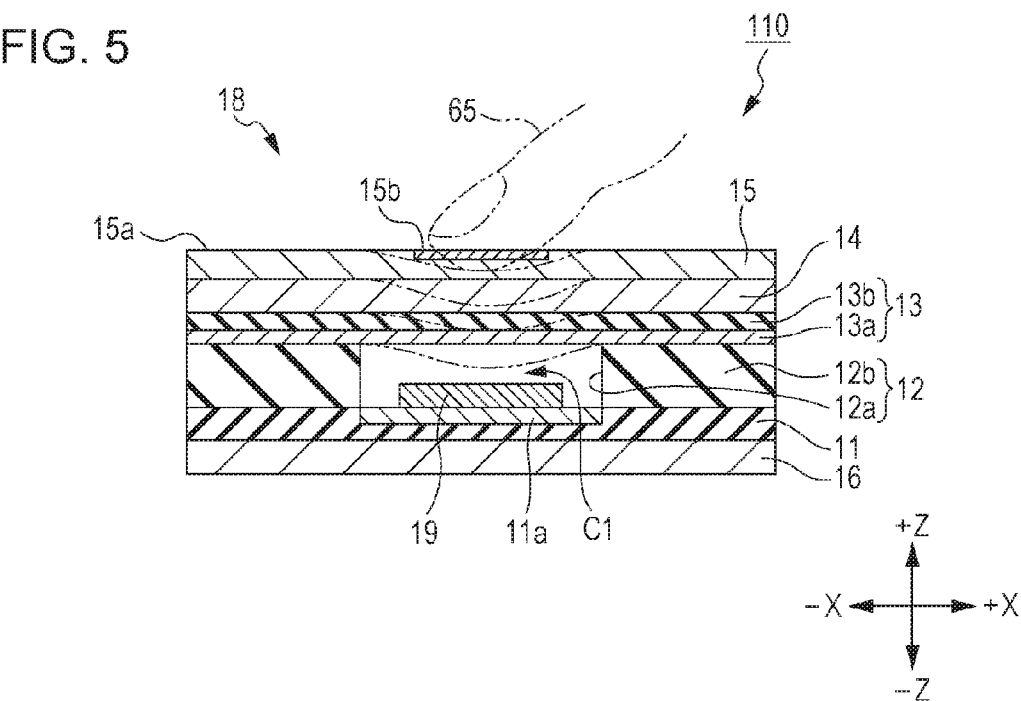
FIG. 5 is a partial sectional view of an in-vehicle input device according to a modification of the first embodiment.

An exemplary configuration and operations of the in-vehicle input device 110 according to a modification of the first embodiment of the present invention will now be described with reference to FIGS. 2 and 5. FIG. 5 is an enlarged sectional view of part of the in-vehicle input device 110.

As illustrated in FIG. 2, the in-vehicle input device 110 includes two touch panels 18 mounted on the right and left of the central part 60a of the steering wheel 60 of the vehicle such that the touch panels 18 are adjacent to the wheel part 60b, or so that the operator can easily operate the in-vehicle input device 110.

The in-vehicle input device 110 differs from the in-vehicle input device 100 in that each touch panel 18 includes a contact member 19 as illustrated in FIG. 5. The in-vehicle input device 110 has the same configuration as that of the in-vehicle input device 100, except for the contact member 19. A description of the configuration excluding the contact member 19 is omitted accordingly. Components excluding the touch panel 18 and the contact member 19 are designated by the same reference numerals as those in the in-vehicle input device 100.

Referring to FIG. 5, the contact member 19 that protrudes into the opening 12a (in the +Z direction) is disposed on the upper surface of the lower electrode 11a included in the touch panel 18 of the in-vehicle input device 110. The contact member 19 is made of a conductive material, such as conductive rubber. In this modification, the contact member 19 is disposed on the upper surface of the lower electrode 11a. The contact member 19 may be disposed on at least one of facing surfaces of the lower electrode 11a and the upper electrode 13a. The contact member 19 may be disposed on a lower surface of the upper electrode 13a.

Referring to FIG. 5, when the operator presses the operation area 15b in the operation surface 15a with the finger 65, the upper sheet 13 is curved and deformed downwardly as indicated by alternate long and two short dashes lines, thus changing the distance between the upper electrode 13a and the lower electrode 11a in the opening 12a.

Since the contact member 19 is disposed on the upper surface of the lower electrode 11a in the in-vehicle input device 110, the distance between the lower electrode 11a and the upper electrode 13a is less than that in the above-described in-vehicle input device 100.

Assuming that the operation area 15b is used to detect an input operation based on contact between the lower electrode 11a and the upper electrode 13a when the operator firmly presses the operation area 15b with the finger 65 to bring the upper electrode 13a into contact with the lower electrode 11a, namely, the operation area 15b is used as the first detecting unit, a switch operation can be easily performed with a small pressure to provide contact between the lower electrode 11a and the upper electrode 13a.

Assuming that the operation area 15b is used to detect an input operation based on a change in capacitance C1 formed between the lower electrode 11a and the upper electrode 13a when the operator lightly presses the operation area 15b with the finger 65 and slides the finger to change the distance between the lower electrode 11a and the upper electrode 13a, namely, the operation area 15b is used as the second detecting unit, the capacitance C1 between the lower electrode 11a and the upper electrode 13a is greater than the capacitance C0 in the in-vehicle input device 100. A change in the capacitance C1 caused by a change in the distance between the lower electrode 11a and the upper electrode 13a is accordingly greater than that in the capacitance C0. Thus, such a slide operation can be easily performed with a small pressure.

When the operation area 15b is used as the first detecting unit in the in-vehicle input device 100 or 110, namely, when the operation area 15b is used for a switch operation, the operation area 15b may be merely pressed. The operation area 15b may have a relatively small detection range. In other words, the opening 12a of the spacer 12 may have a relatively small area. On the other hand, when the operation area 15b is used as the second detecting unit, namely, when the operation area 15b is used for a slide operation, the operation area 15b requires a relatively large detection range. In other words, the length of the opening 12a of the spacer 12 in a sliding direction in which the operator slides the finger 65 needs to be set relatively long.

If the length of the opening 12a in the sliding direction in which the operator slides the finger 65 is long, the operation sheet 15 including the operation surface 15a would deform or sag over time. The distance between the lower electrode 11a and the upper electrode 13a would change accordingly. In spite of the absence of any operation in the operation area 15b, it might be erroneously determined that an operation has been performed in the operation area 15b.

A second embodiment and a third embodiment of the present invention are intended to reduce aging effects of the operation sheet 15.

Second Embodiment

Figure 6:
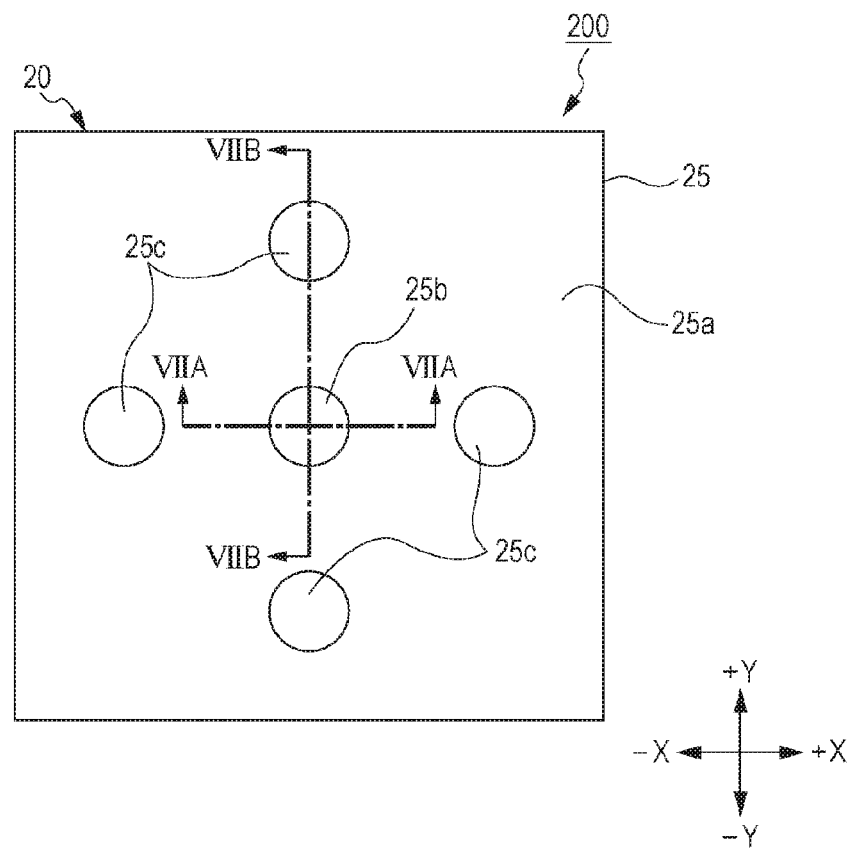
FIG. 6 is a partial plan view of an in-vehicle input device according to a second embodiment.
Figure 7A:
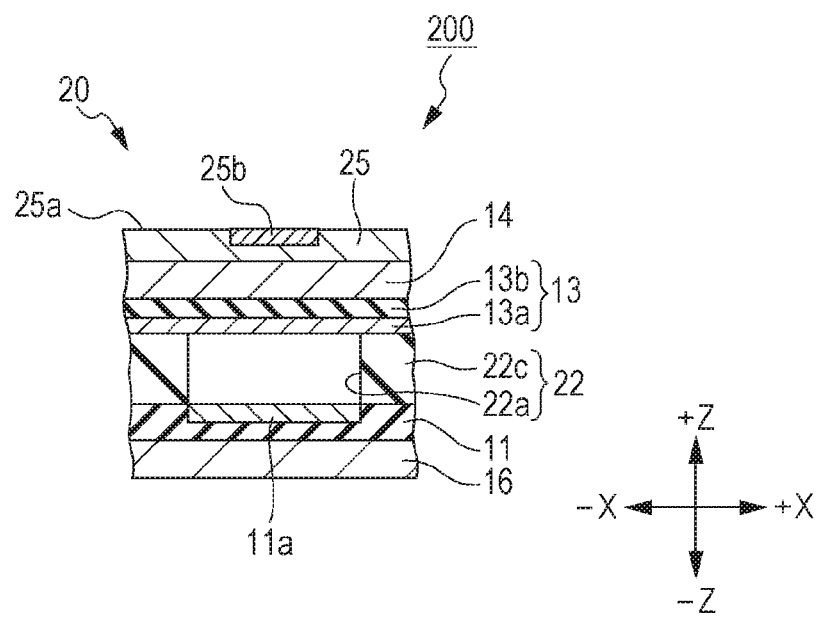
FIGS. 7A and 7B are partial sectional views of the in-vehicle input device according to the second embodiment.
Figure 7B:
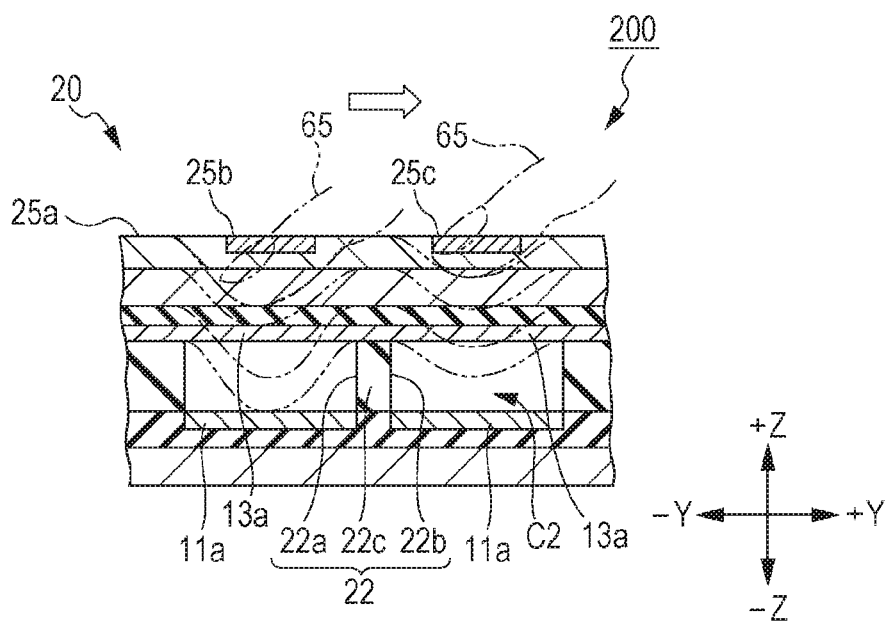

An exemplary configuration and operations of the in-vehicle input device 200 according to the second embodiment of the present invention will now be described with reference to FIGS. 2, 6, 7A, and 7B. FIG. 6 is an enlarged plan view of part of the in-vehicle input device 200. FIGS. 7A and 7B are enlarged sectional views of parts of the in-vehicle input device 200. FIG. 7A is a sectional view of part including a first operation area 25b of the in-vehicle input device 200. FIG. 7B is a sectional view of part of the in-vehicle input device 200 in which the first operation area 25b is used as the first detecting unit and a second operation area 25c is used as the second detecting unit. FIG. 7A illustrates a section as viewed from the line VIIA-VIIA in FIG. 6. FIG. 7B illustrates a section as viewed from the line VIIB-VIIB in FIG. 6.

In the in-vehicle input device 200, the same components as those in the in-vehicle input device 100 are designated by the same reference numerals. A detailed description of these components is omitted.

As illustrated in FIG. 2, the in-vehicle input device 200 includes two touch panels 20 mounted on the right and left of the central part 60a of the steering wheel 60 of the vehicle such that the touch panels 20 are adjacent to the wheel part 60b, or so that the operator can easily operate the in-vehicle input device 200.

The in-vehicle input device 200 has the same fundamental configuration as that of the in-vehicle input device 100, except for the first operation area 25b and the second operation areas 25c included in an operation surface 25a illustrated in FIG. 6.

Referring to FIG. 6, each touch panel 20 includes an operation sheet 25 having an upper surface that includes the operation surface 25a. The operation surface 25a includes the first operation area 25b and the second operation areas 25c. In the present embodiment, the first operation area 25b is disposed at the middle of the operation surface 25a illustrated in FIG. 6, and the second operation areas 25c are arranged around the first operation area 25b. Each of the second operation areas 25c is disposed at a relatively short distance from the first operation area 25b. The second operation areas 25c are arranged on the right and left sides of the first operation area 25b and on the sides thereof farther from and closer to the operator such that each second operation area 25c is disposed at an angle of 90° from adjacent second operation areas 25c. Although the first operation area 25b and the second operation areas 25c each have a circular shape in this embodiment, these areas may have a rectangular shape, for example.

As illustrated in FIG. 7A, the touch panel 20 includes, in sequence from top to bottom, the operation sheet 25, the suppression layer 14, the upper sheet 13 including the upper electrode 13a and the insulating layer 13b, a spacer 22, the lower sheet 11 including the lower electrode 11a, and the lower suppression layer 16 in the first operation area 25b and its vicinity. The touch panel 20 has the same arrangement in each of the second operation areas 25c and their vicinities.

As illustrated in FIG. 7A, the spacer 22 is disposed between the lower sheet 11 and the upper electrode 13a. The spacer 22 includes an insulator 22c disposed between the lower sheet 11 and the upper electrode 13a. As illustrated in FIG. 7B, the spacer 22 has a first opening 22a disposed between the lower electrode 11a and the upper electrode 13a so as to coincide with the first operation area 25b in plan view and second openings 22b arranged between the lower electrode 11a and the upper electrode 13a so as to coincide with the second operation areas 25c in plan view. The first opening 22a is separated from the second openings 22b by the insulator 22c. The insulator 22c, the first opening 22a, and the second openings 22b of the spacer 22 are made in the same manner as that for the insulator 12b and the openings 12a of the spacer 12 in the in-vehicle input device 100.

In the in-vehicle input device 200, the first operation area 25b is used as the first detecting unit and each second operation area 25c is used as the second detecting unit such that any one of the second operation areas 25c is operated as the second detecting unit in a predetermined period of time that is relatively short, for example, 0.5 seconds, after an operation of the first operation area 25b as the first detecting unit. In this embodiment, it is assumed that the second operation area 25c located farther from the operator (in the +Y direction) of the multiple second operation areas 25c is used. As illustrated in FIG. 7B, the operator presses the first operation area 25b in the operation surface 25a with the finger 65 to bring the upper electrode 13a into contact with the lower electrode 11a, thus performing a switch operation. The operator then slides the finger 65 on the operation surface 25a in the direction away from the operator (in the +Y direction) in, for example, 0.5 seconds, and presses the second operation area 25c located farther from the operator (in the +Y direction) in the operation surface 25a, thus changing a capacitance C2 between the lower electrode 11a and the upper electrode 13a.

In response to such an operation, the in-vehicle input device 200 determines that a flick operation has been performed on the in-vehicle input device 200. The flick operation is an operation used for, for example, Japanese language input, and enables quick input of a target character or symbol. If the second operation area 25c is pressed in more than 0.5 seconds, for example, one second after pressing of the first operation area 25b, the in-vehicle input device 200 will determine that the first operation area 25b and the second operation area 25c have been operated individually, instead of determining that a flick operation has been performed.

The second operation areas 25c are set to provide different operations. When the first operation area 25b is operated as the first detecting unit and any one of the second operation areas 25c is then operated in the above-described manner to achieve a flick operation, an operation associated with the operated second operation area 25c can be performed.

Third Embodiment

Figure 8:
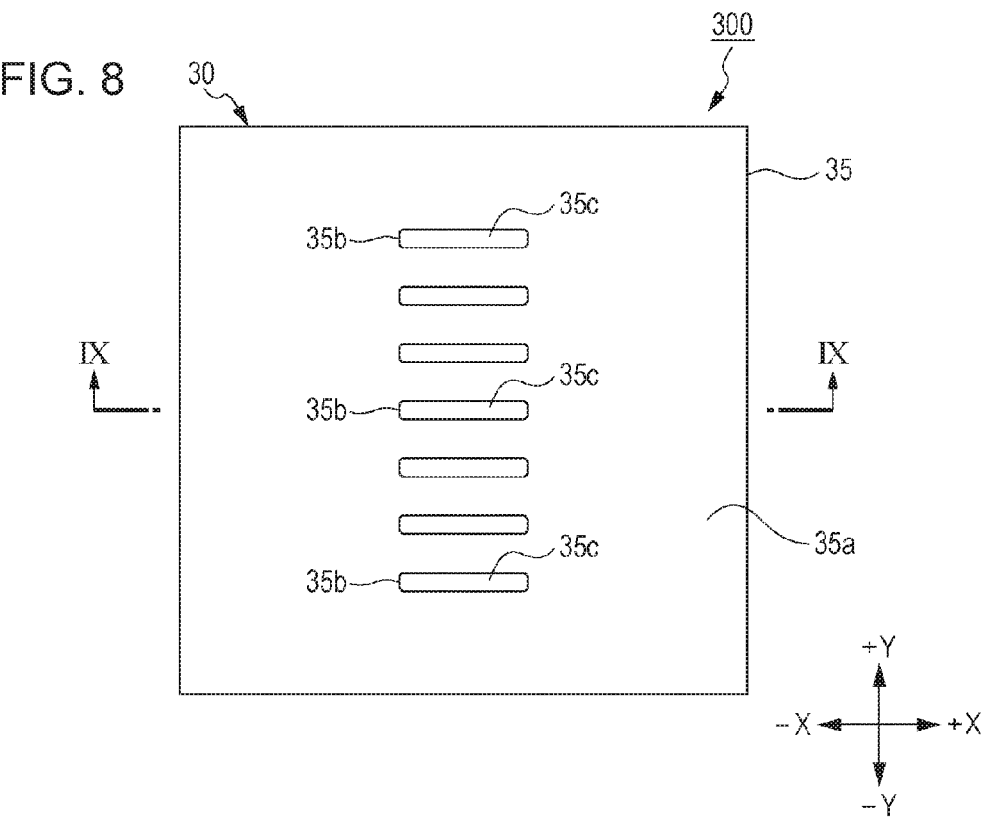
FIG. 8 is a partial plan view of an in-vehicle input device according to a third embodiment.
Figure 9:
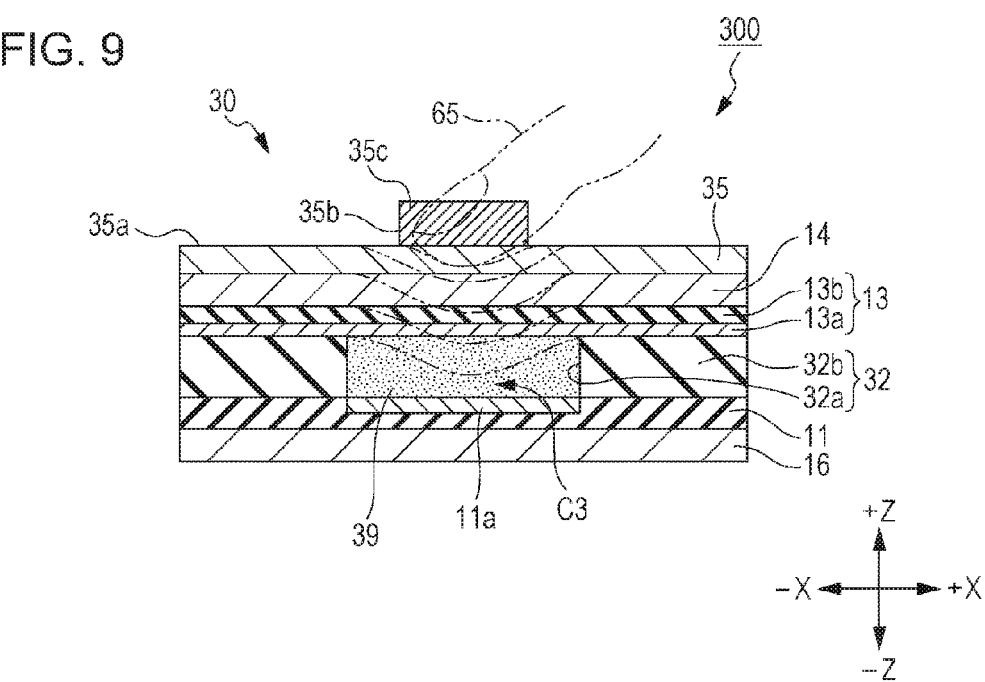
FIG. 9 is a partial sectional view of the in-vehicle input device according to the third embodiment.
Figure 10:
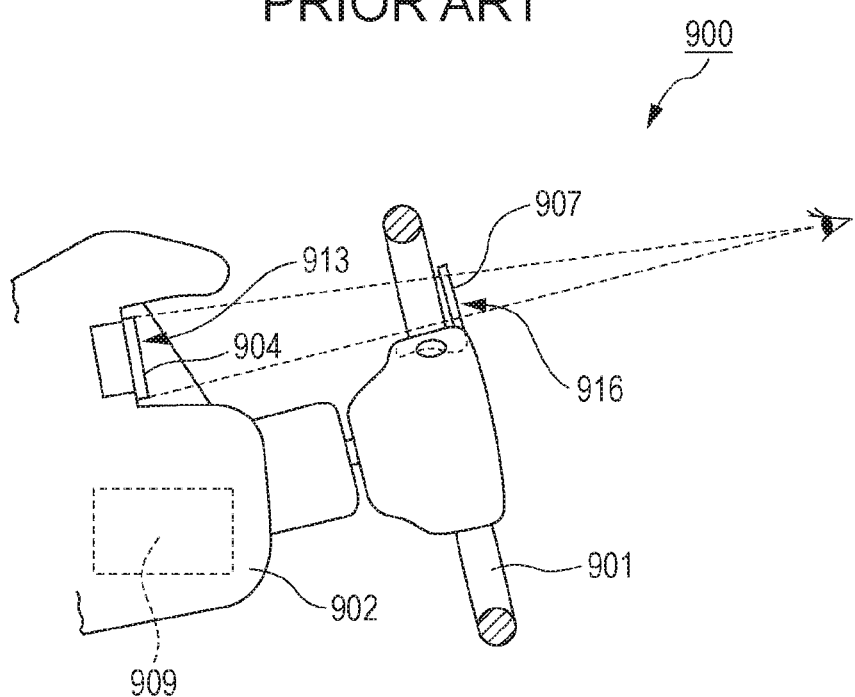
FIG. 10 is a schematic diagram illustrating a related-art operation device for in-vehicle apparatuses.

An exemplary configuration and operations of the in-vehicle input device 300 according to a third embodiment of the present invention will now be described with reference to FIGS. 2, 8, and 9. FIG. 8 is an enlarged plan view of part of the in-vehicle input device 300. FIG. 9 is an enlarged sectional view of part of the in-vehicle input device 300. FIG. 9 illustrates a section as viewed from the line IX-IX in FIG. 8.

In the in-vehicle input device 300, the same components as those in the in-vehicle input device 100 are designated by the same reference numerals. A detailed description of these components is omitted.

As illustrated in FIG. 2, the in-vehicle input device 300 includes two touch panels 30 mounted on the right and left of the central part 60*a* of the steering wheel 60 of the vehicle such that the touch panels 30 are adjacent to the wheel part 60*b*, or so that the operator can easily operate the in-vehicle input device 300.

As illustrated in FIG. 9, each touch panel 30 includes, in sequence from top to bottom, an operation sheet 35, the suppression layer 14, the upper sheet 13 including the upper electrode 13*a* and the insulating layer 13*b*, a spacer 32, the lower sheet 11 including the lower electrode 11*a*, and the lower suppression layer 16.

As illustrated in FIG. 8, in the touch panel 30, the operation sheet 35 has an upper surface that includes an operation surface 35*a*. The operation surface 35*a* includes a plurality of third operation areas 35*b* arranged in directions closer to and away from the operator, or the Y direction. The adjacent third operation areas 35*b* are arranged at a relatively short distance from each other. To provide such a relatively short distance between the adjacent third operation areas 35*b*, the third operation areas 35*b* each have a rectangular shape having short sides extending in the Y direction in plan view in the present embodiment.

Referring to FIG. 9, each of the third operation areas 35*b* in the in-vehicle input device 300 is a protrusion 35*c* that protrudes upward from the operation surface 35*a*. To press any of the third operation areas 35*b*, the operator presses an upper surface of the corresponding protrusion 35*c* at a higher level than the operation surface 35*a*. The protrusion 35*c* may be formed by printing or applying soft resin, such as silicone resin, to the operation surface. Alternatively, the protrusion 35*c* may be formed such that a hole is formed in the operation sheet 35 and the hole is filled with a fluid to raise part of the operation sheet 35.

As illustrated in FIG. 9, the spacer 32 is disposed between the lower sheet 11 and the upper electrode 13*a*. The spacer 32 includes an insulator 32*b* disposed between the lower sheet 11 and the upper electrode 13*a* and has a plurality of third openings 32*a* arranged between the lower electrode 11*a* and the upper electrode 13*a* so as to coincide with the third operation areas 35*b* in plan view. The adjacent third openings 32*a* are separated from each other by the insulator 32*b*. The insulator 32*b* and the third openings 32*a* of the spacer 32 are made in the same manner as that for the insulator 12*b* and the openings 12*a* of the spacer 12 in the in-vehicle input device 100.

The spacer 32 differs from the spacer 12 in the in-vehicle input device 100 in that each of the third openings 32*a* is filled with an elastic member 39 as illustrated in FIG. 9. The elastic member 39 is made of soft resin. The viscosity of a material for the elastic member 39 is set so that a pressure applied to the third operation area 35*b* is transmitted through the operation sheet 35, the suppression layer 14, and the upper sheet 13 to appropriately curve and deform the upper electrode 13*a*. A capacitance C3 is formed in the elastic member 39 between the lower electrode 11*a* and the upper electrode 13*a*. The elastic member 39 functions as a dielectric, and thus allows the capacitance C3 to be greater than that in a configuration with no elastic member 39. Consequently, a change in the capacitance C3 can be greater than that in the configuration with no elastic member 39.

In the in-vehicle input device 300, for example, the operator presses the center third operation area 35*b* of the multiple third operation areas 35*b* in FIG. 8, or the center protrusion 35*c* with the finger 65 and then presses other third operation areas 35*b* while sliding the finger 65 in the direction away from the operator, or in the +Y direction. The operator may press the center third operation area 35*b* of the multiple third operation areas 35*b* with the finger 65 and then press other third operation areas 35*b* while sliding the finger 65 in the direction closer to the operator, or in the −Y direction.

In such an operation, the operator sequentially applies a pressure to the multiple third operation areas 35*b* with the finger 65. The third operation areas 35*b* can be used for a high-speed slide operation. For example, the third operation areas 35*b* can be used to quickly and continuously adjust the volume of the in-vehicle audio system.

Each of the third openings 32*a* in the spacer 32 is filled with the elastic member 39. This enables a reduction in the length of each third opening 32*a* in the sliding direction, or the short side of the rectangular third opening 32*a*. Consequently, the length of the third operation area 35*b* in the sliding direction can be reduced.

Advantages of the above-described embodiments will now be described.

The in-vehicle input device 100 detects an input operation in response not to touching any of the touch panels 10 by the operator's finger 65, but to pressing any of the operation areas 15*b* by the finger 65. If the operator wears gloves, the operator can operate the in-vehicle input device 100. In addition, the suppression layer 14, which eliminates or reduces the formation of the capacitance C0 between the operator and the upper electrode 13*a*, can prevent an erroneous operation from being caused by unintended finger motion during driving. Furthermore, the operator can press the operation areas 15*b* of each touch panel 10 while rotating the steering wheel 60, and can thus perform an input operation regardless of an operation state of the steering wheel 60.

The first detecting unit based on contact between the lower electrode 11*a* and the upper electrode 13*a* and the second detecting unit based on a change in the capacitance C0 between the lower electrode 11*a* and the upper electrode 13*a*, namely, the two different detecting units can be used differently based on the magnitude of a pressure applied to the operation area 15*b*.

A switch operation for the first detecting unit and a slide operation for the second detecting unit can be combined. This facilitates various operations.

The in-vehicle input device 200 detects a flick operation in response to an operation of any of the second operation areas 25*c* as the second detecting unit in a predetermined period of time after an operation of the first operation area 25*b* as the first detecting unit. Thus, a flick operation can be easily performed.

In the in-vehicle input device 300, the length of each third opening 32*a* in the sliding direction can be reduced, thus reducing a likelihood that the aging deformation or sag of the operation sheet 35 may affect an operation. In addition, each third operation area 35*b* is the protrusion 35*c* protruding upward from the operation surface 35*a*. This facilitates an operation in the third operation area 35*b* having the reduced length in the sliding direction. This also eliminates the need for viewing the touch panels 30, thus increasing the safety of driving.

The in-vehicle input device 110 includes the contact member 19 in each operation area 15b and can thus be operated by lightly pressing any of the operation areas 15b. It is particularly effective when the operation area 15b is used as the first detecting unit that requires a greater pressure than the second detecting unit.

The present invention is not limited to the above-described embodiments, but can be variously modified and practiced without departing from the spirit and scope of the invention. For example, although the contact member 19 is included in the modification of the in-vehicle input device 100 according to the first embodiment, the contact member 19 may be included in the in-vehicle input devices 200 and 300.

What is claimed is:

1. An on-vehicle input device comprising:
    a touch panel including:
        a lower electrode;
        an upper electrode facing the lower electrode;
        an operation surface located above the upper electrode, the operation surface including a plurality of operation areas;
        a spacer disposed between the lower electrode and the upper electrode, the spacer having a plurality of openings disposed under the operation areas such that the operation areas are superimposed on the corresponding operation areas in plan view; and
        a first suppression layer disposed between the operation surface and the upper electrode, or disposed on an upper surface of the operation surface, the first suppression layer being made of a conductive metal to be a first shield eliminating or reducing formation of a capacitance between the upper electrode and an operator; and
        a second suppression layer disposed below the lower electrode on a side opposite to the upper electrode, the second suppression layer being made of a conductive metal to be a second shield eliminating or reducing formation of a capacitance between the lower electrode and the operator,
    wherein the device is configured to detect an input operation by an operator, based on a change in a distance between the lower electrode and the upper electrode in the openings in response to the operator's pressing any of the operation areas.

2. The on-vehicle input device according to claim 1, further comprising:
    a first detecting mechanism configured to detect the input operation when the lower electrode and the upper electrode come into contact with each other; and
    a second detecting mechanism configured to detect the input operation based on a change in capacitance caused by the change in the distance between the lower electrode and the upper electrode.

3. The on-vehicle input device according to claim 2, wherein the first detecting mechanism detects a switch operation performed on the operation area and the second detecting mechanism detects a slide operation performed on the operation area.

4. The on-vehicle input device according to claim 3, wherein the plurality of operation areas include a first operation area for the first detection mechanism and a second operation area for the second detection mechanism, and the plurality of opening include a first opening corresponding to the first operation area and a second opening corresponding to the second operation area, and
    wherein the device detects a flick operation when a switch operation performed on the second operation area is detected within a predetermined time period after a slide operation onto the first operation area is detected.

5. The on-vehicle input device according to claim 1, wherein the plurality of operation areas include a plurality of third operation areas, and the plurality of openings include a plurality of third openings corresponding to the third operation areas, and
    wherein each of the third openings is filled with an elastic member and each of the third areas is formed as a protrusion protruding upward from the operation surface.

6. The on-vehicle input device according to claim 1, further comprising:
    a conductive contact member disposed on at least one of facing surfaces of the lower and upper electrodes, the contact member protruding into corresponding one of the openings.

* * * * *